(12) United States Patent
Ahn et al.

(10) Patent No.: US 12,040,137 B2
(45) Date of Patent: Jul. 16, 2024

(54) MULTILAYER CAPACITOR

(71) Applicant: SAMSUNG ELECTRO-MECHANICS CO., LTD., Suwon-si (KR)

(72) Inventors: Young Ghyu Ahn, Suwon-si (KR); Soo Hwan Son, Suwon-si (KR); Hwi Dae Kim, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 55 days.

(21) Appl. No.: 17/685,934

(22) Filed: Mar. 3, 2022

(65) Prior Publication Data

US 2023/0215637 A1 Jul. 6, 2023

(30) Foreign Application Priority Data

Dec. 31, 2021 (KR) .......................... 10-2021-0194412

(51) Int. Cl.
*H01G 4/232* (2006.01)
*H01G 4/012* (2006.01)
(Continued)

(52) U.S. Cl.
CPC ............... *H01G 4/232* (2013.01); *H01G 4/30* (2013.01); *H01G 4/012* (2013.01); *H01G 4/1227* (2013.01)

(58) Field of Classification Search
CPC .......... H01G 4/232; H01G 4/12; H01G 2/065; H01G 2/24; H01G 4/0085; H01G 4/012; H01G 4/20; H01G 4/2325; H01G 4/30; H01G 4/306; H01G 4/33; H01G 4/1227; H01G 4/248; H01G 4/02
See application file for complete search history.

(56) References Cited

U.S. PATENT DOCUMENTS

| 9,775,232 B2 * | 9/2017 | Park | ..................... H01G 4/1227 |
| 2010/0091426 A1 * | 4/2010 | Motoki | ..................... H01C 7/18 29/25.42 |

(Continued)

FOREIGN PATENT DOCUMENTS

| JP | 2015-228481 A | 12/2015 |
| JP | 2017-175037 A | 9/2017 |

(Continued)

*Primary Examiner* — Michael P McFadden
(74) *Attorney, Agent, or Firm* — Morgan, Lewis & Bockius LLP

(57) ABSTRACT

A multilayer capacitor includes: a body including internal electrodes stacked in a first direction; and first and second external electrodes disposed on the body. A portion of the first external electrode overlaps the body in the first direction and does not overlap a remainder of the first external electrode in the first direction. A portion of the second external electrode overlaps the body in the first direction and does not overlap a remainder of the second external electrode in the first direction. At least one of the external electrodes includes: a second electrode layer covering a first electrode layer, which covers one portion of an edge of the body. A width W1 of a portion of the first electrode layer, closest to the one portion of the edge, is narrower than a width W2 of an end of the second electrode layer, farthest from the first electrode layer.

24 Claims, 7 Drawing Sheets

(51) Int. Cl.
    *H01G 4/12*     (2006.01)
    *H01G 4/30*     (2006.01)

(56) References Cited

U.S. PATENT DOCUMENTS

| | | | |
|---|---|---|---|
| 2015/0084487 A1* | 3/2015 | Mori | H01G 4/248 |
| | | | 336/200 |
| 2015/0325377 A1 | 11/2015 | Takeuchi et al. | |
| 2016/0042869 A1* | 2/2016 | Park | H01G 4/30 |
| | | | 29/25.42 |
| 2017/0250028 A1 | 8/2017 | Makino | |
| 2017/0278634 A1 | 9/2017 | Kato | |
| 2017/0330689 A1* | 11/2017 | Hatanaka | H01G 2/065 |
| 2017/0345572 A1* | 11/2017 | Sasaki | H01G 4/232 |
| 2017/0367187 A1* | 12/2017 | Chae | H05K 1/181 |
| 2018/0025845 A1* | 1/2018 | Sato | H01G 2/103 |
| | | | 361/321.2 |
| 2018/0174753 A1* | 6/2018 | Terashita | H01G 4/008 |
| 2019/0096583 A1* | 3/2019 | Sasaki | H01G 4/232 |
| 2019/0131076 A1* | 5/2019 | Fukumura | H01G 4/232 |
| 2020/0312550 A1 | 10/2020 | Nagai et al. | |

FOREIGN PATENT DOCUMENTS

| | | |
|---|---|---|
| JP | 2020-161516 A | 10/2020 |
| KR | 10-2017-0101121 A | 9/2017 |

\* cited by examiner

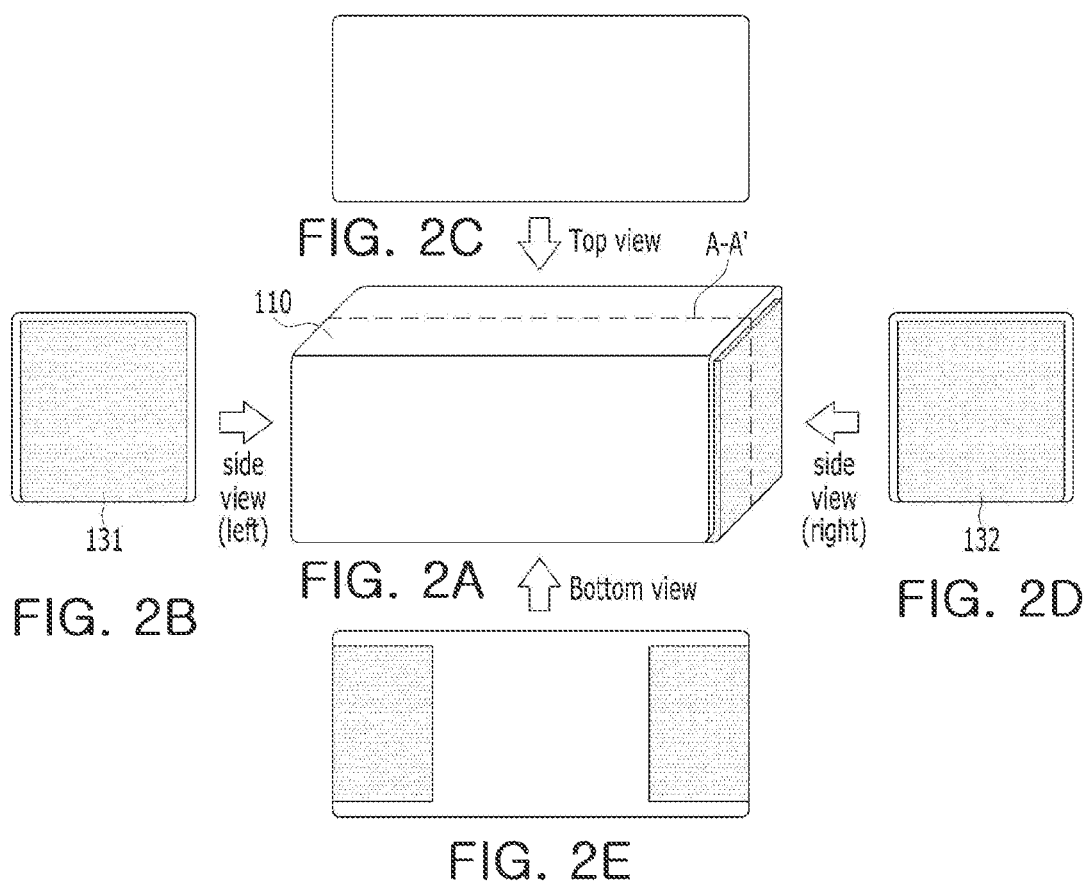

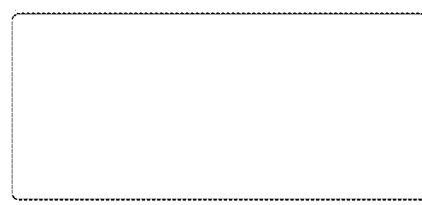
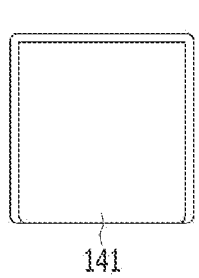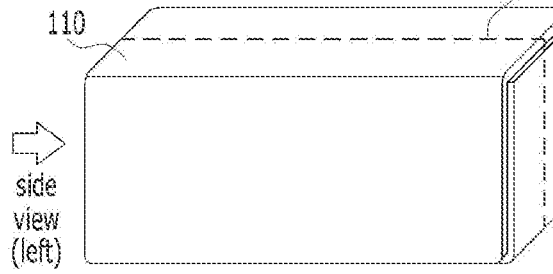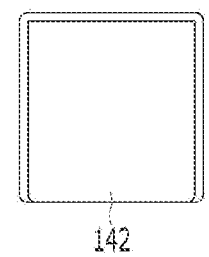
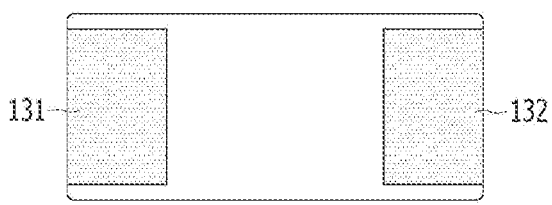

MULTILAYER CAPACITOR

CROSS-REFERENCE TO RELATED APPLICATION(S)

This application claims benefit of priority to Korean Patent Application No. 10-2021-0194412 filed on Dec. 31, 2021 in the Korean Intellectual Property Office, the disclosure of which is incorporated herein by reference in its entirety.

TECHNICAL FIELD

The present disclosure relates to a multilayer capacitor.

BACKGROUND

A multilayer capacitor has been widely used as a component of an electronic device such as a computer, a personal digital assistant (PDA), a mobile phone because the multilayer capacitor has a small size, implements a high capacitance and may be easily mounted, and has also been widely used as a component of an electric device (including a vehicle) because the multilayer capacitor has high reliability and high strength characteristic.

The multilayer capacitor may be smaller when used in the electronic device, and it may thus be important for the multilayer capacitor to have higher capacitance compared to a volume thereof.

When used in the electric device, the multilayer capacitor may be exposed to a harsh environment (e.g., high voltage, high temperature or the possibility of external impacts). Accordingly, it may be more important for the multilayer capacitor to include an external electrode having high reliability.

SUMMARY

An aspect of the present disclosure may provide a multilayer capacitor.

According to an aspect of the present disclosure, a multilayer capacitor may include: a body including a capacitance region in which at least one first internal electrode and at least one second internal electrode are alternately stacked on each other interposing at least one dielectric layer therebetween in a first direction; and first and second external electrodes disposed on the body while being spaced apart from each other to be respectively connected to the at least one first internal electrode and the at least one second internal electrode, wherein a portion of the first external electrode overlaps the body in the first direction and does not overlap a remainder of the first external electrode in the first direction, a portion of the second external electrode overlaps the body in the first direction and does not overlap a remainder of the second external electrode in the first direction, at least one of the first and second external electrodes includes: a first electrode layer covering a portion of an edge of the body; and a second electrode layer covering the first electrode layer and connected to at least one portion of the at least one first internal electrode or the at least one second internal electrode, and a width W1 of a portion of the first electrode layer, positioned closest to the one portion of the edge of the body, is narrower than a width W2 of an end of the second electrode layer, positioned farthest from the first electrode layer.

According to another aspect of the present disclosure, a multilayer capacitor may include: a body including a capacitance region in which at least one first internal electrode and at least one second internal electrode are alternately stacked on each other interposing at least one dielectric layer therebetween in a first direction; and first and second external electrodes disposed on the body while being spaced apart from each other to be respectively connected to the at least one first internal electrode and the at least one second internal electrode, wherein a portion of the first external electrode overlaps the body in the first direction and does not overlap a remainder of the first external electrode in the first direction, a portion of the second external electrode overlaps the body in the first direction and does not overlap a remainder of the second external electrode in the first direction, the body further includes a lower cover layer providing a lower surface of the body, partially covered by the first and second external electrodes and overlapping the capacitive region in the first direction, at least one of the first and second external electrodes includes: a first electrode layer covering one portion of an edge of the body; and a second electrode layer covering the first electrode layer and connected to at least at least a portion of the at least one first internal electrode or the at least one second internal electrode, and a length T1 between a portion of the first electrode layer, positioned closest to the one portion of the edge of the body, and an end of the first electrode layer is equal to or greater than a thickness T2 of the lower cover layer.

According to another aspect of the present disclosure, a method of manufacturing a multilayer capacitor may include: performing sputtering or chemical vapor deposition to form a first electrode layer of an external electrode on a body of the multilayer capacitor.

BRIEF DESCRIPTION OF DRAWINGS

The above and other aspects, features and advantages of the present disclosure will be more clearly understood from the following detailed description taken in conjunction with the accompanying drawings, in which:

FIGS. 2A-2E are views illustrating the multilayer capacitor according to an exemplary embodiment of the present disclosure;

FIGS. 3A-3E are views illustrating that an insulating layer is added to the multilayer capacitor according to an exemplary embodiment of the present disclosure;

DETAILED DESCRIPTION

Figure 1:
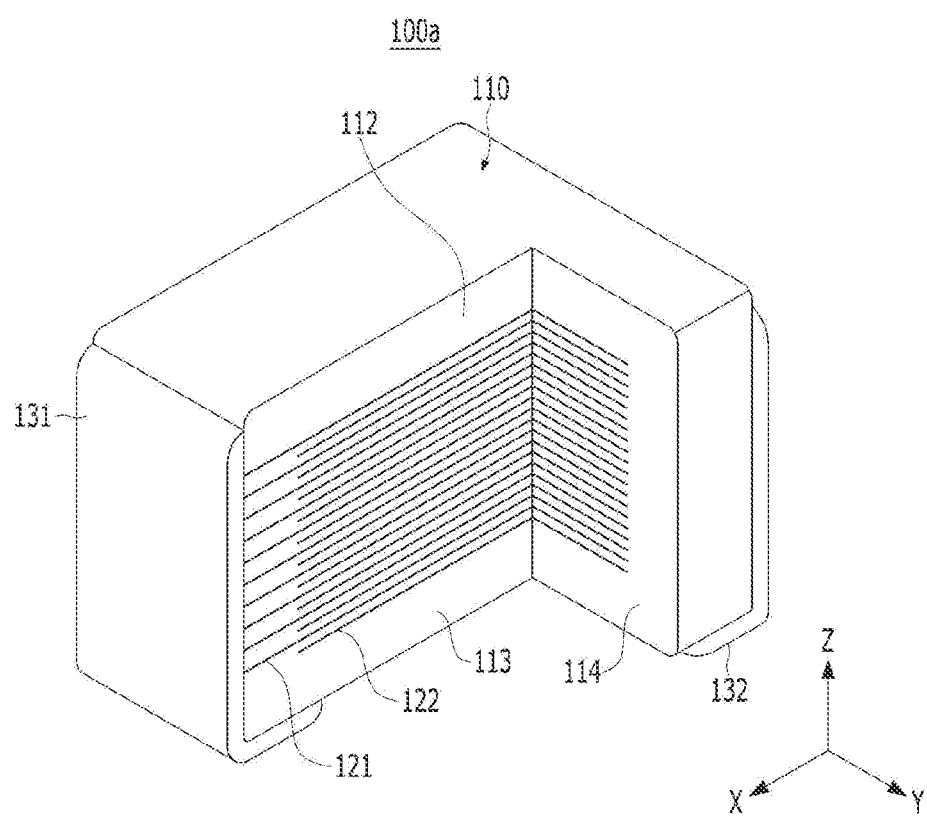
FIG. 1 is a perspective view illustrating the inside of a multilayer capacitor according to an exemplary embodiment of the present disclosure.

Hereinafter, exemplary embodiments of the present disclosure will now be described in detail with reference to the accompanying drawings.

In order to clearly describe exemplary embodiments of the present disclosure, directions of a hexahedron may be defined as follows: an X-direction, a Y-direction and a Z-direction in the drawings respectively refer to a length direction, a width direction and a thickness direction. Here, the thickness direction may refer to a stack direction (or first direction) in which dielectric layers are stacked.

Hereinafter, the description describes a multilayer capacitor according to an exemplary embodiment of the present disclosure, and in particular, a multi-layer ceramic capacitor (MLCC), and the present disclosure is not limited thereto.

Figure 2F:
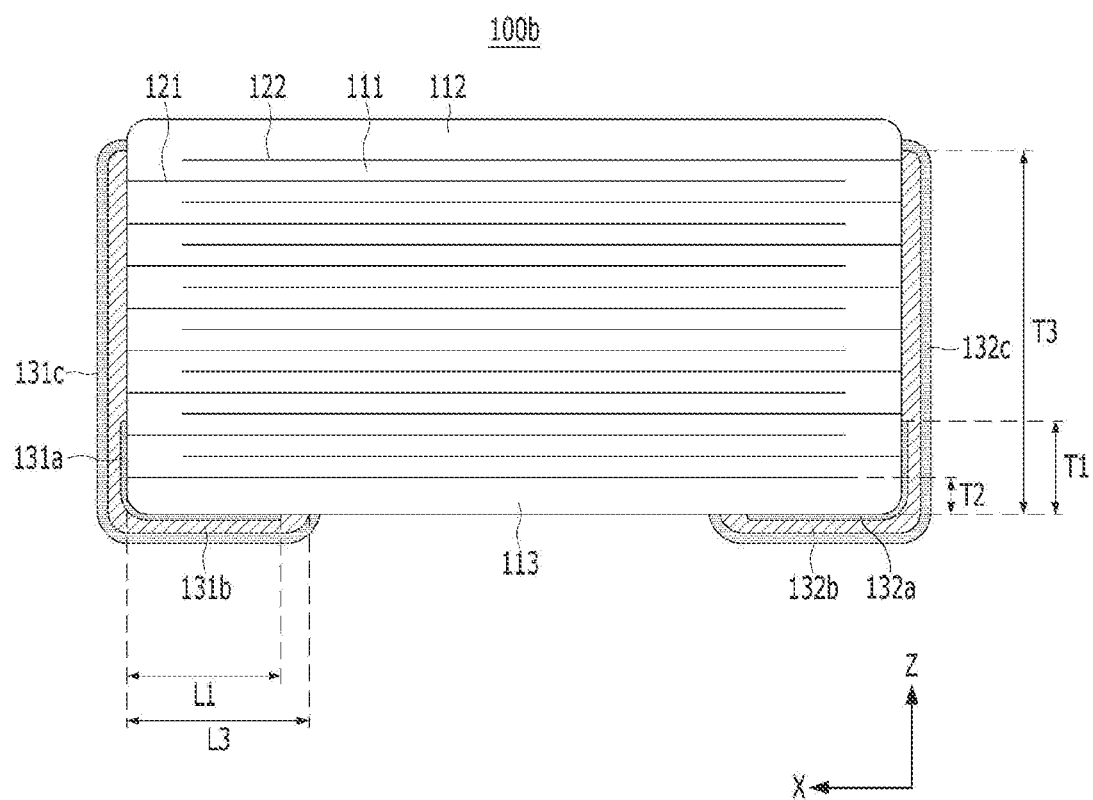
FIG. 2F is a cross-sectional view taken along line A-A' of FIG. 2A.
Figure 4A:
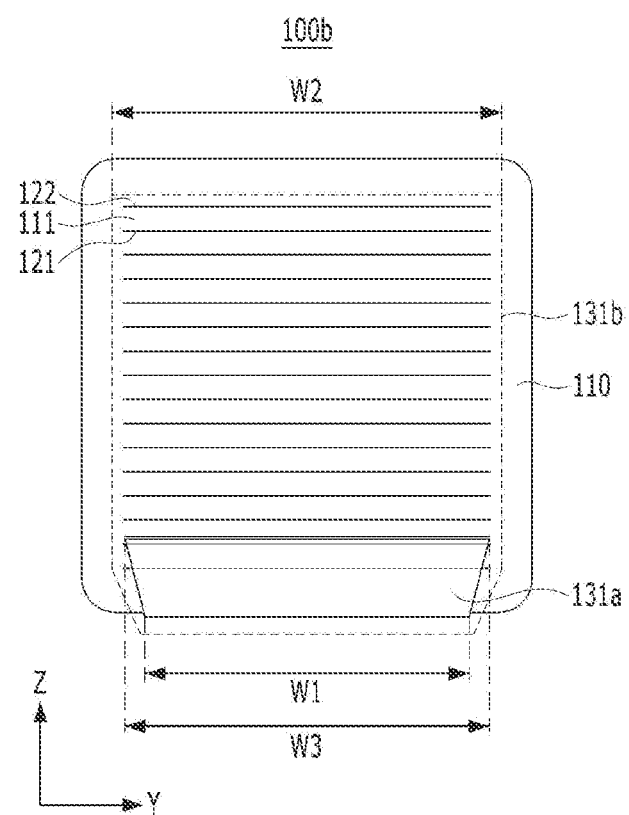
FIG. 4A is a side view illustrating a width of a first electrode layer of the multilayer capacitor according to an exemplary embodiment of the present disclosure.

FIG. 1 is a perspective view illustrating the inside of the multilayer capacitor according to an exemplary embodiment of the present disclosure; FIGS. 2A-2E are views illustrating the multilayer capacitor according to an exemplary embodiment of the present disclosure; FIG. 2F is a cross-sectional view taken along line A-A' of FIG. 2A; and FIG. 4A is a side view illustrating a width of a first electrode layer of the multilayer capacitor according to an exemplary embodiment of the present disclosure.

Referring to FIGS. 1 and 2A-2F, a multilayer capacitor 100a or 100b according to an exemplary embodiment of the present disclosure may include a body 110, a first external electrode 131 and a second external electrode 132.

The body 110 may include a capacitance region in which at least one first internal electrode 121 and at least one second internal electrode 122 are alternately stacked on each other interposing at least one dielectric layer 111 therebetween in a first direction (e.g., Z-direction).

For example, the body 110 may be a ceramic body formed by sintering the capacitance region. Here, the at least one dielectric layer 111 disposed in the body 110 may be in a sintered state, and a boundary between the adjacent dielectric layers may be integrated to each other, thus making it difficult to confirm a boundary therebetween without using a scanning electron microscope (SEM).

For example, the body 110 may have a shape of a hexahedron having two side surfaces in the length direction (X-direction), two side surfaces in the width direction (Y-direction) and two side surfaces in the thickness direction (Z-direction), and this hexahedron may have edges/corners polished to have a round shape. However, the shape and dimension of the body 110 and the number of the dielectric layers 111 may not be limited to those described in this exemplary embodiment.

The at least one dielectric layer 111 may have a thickness arbitrarily changed based on a capacitance design of the multilayer capacitor 100a or 100b, and may include a ceramic powder having high dielectric constant, e.g., barium titanate ($BaTiO_3$) based powder. However, the present disclosure is not limited thereto. In addition, various ceramic additives (e.g., MgO, $Al_2O_3$, $SiO_2$ or ZnO), organic solvents, plasticizers, binders, dispersants or the like may be added to the ceramic powder based on a required specification of the multilayer capacitor 100a or 100b.

An average particle diameter of the ceramic powder used to form the at least one dielectric layer 111 may not be particularly limited, may be adjusted based on the required specification of the multilayer capacitor 100a or 100b (e.g., miniaturization and/or high capacitance required for a capacitor for an electronic device, or high withstand voltage characteristic and/or strong strength required for a capacitor for an electric device), and may be adjusted to 400 nm or less for example.

For example, the at least one dielectric layer 111 may be formed by applying a slurry including the powder such as the barium titanate ($BaTiO_3$) or the like, to a carrier film and then drying the same to prepare a plurality of ceramic sheets. The ceramic sheets may be formed by mixing the ceramic powder, a binder and a solvent with one another to prepare the slurry and then manufacturing the slurry in a shape of the sheet having a thickness of several micrometers by using a doctor blade method, and the present disclosure is limited thereto.

The at least one first internal electrode 121 and the at least one second internal electrode 122 may be formed as follows: conductive pastes each including a conductive metal are printed; arranged along the stack direction (e.g., Z-direction) of the dielectric layer to be exposed alternately from one side surface and the other side surface of the body 110 in the length direction (X-direction); and electrically insulated from each other by the dielectric layer interposed therebetween.

For example, the at least one first internal electrode 121 and the at least one second internal electrode 122 may each be formed of a conductive paste for an internal electrode, having an average particle size of 0.1 to 0.2 μm, and including 40 to 50 wt % of conductive metal powder, and the present disclosure is limited thereto. The conductive paste may include single metal powder such as nickel (Ni), copper (Cu), palladium (Pd), silver (Ag), lead (Pb) or platinum (Pt), or an alloy thereof, and the present disclosure is limited thereto.

For example, the conductive paste for an internal electrode may be applied to the ceramic sheets by using a printing method or the like, to form an internal electrode pattern. The printing method of the conductive paste may be a screen printing method, a gravure printing method or the like, and the present disclosure is not limited thereto. For example, two hundred or three hundred ceramic sheets on each of which the internal electrode pattern is printed may be stacked, pressed and sintered to manufacture the body 110.

A capacitance of the multilayer capacitor 100a or 100b may be proportional to an area in which the at least one first internal electrode 121 and the at least one second internal electrode 122 overlap each other in the stack direction (e.g., T-direction), proportional to a total stack number of the at least one first internal electrode 121 and the at least one second internal electrode 122, and inversely proportional to a distance between the at least one first internal electrode 121 and the at least one second internal electrode 122. The distance between the internal electrodes may be substantially equal to each thickness of the at least one dielectric layer 111.

The multilayer capacitor 100a or 100b may have higher capacitance compared to its thickness as the distance between the at least one first internal electrode 121 and the at least one second internal electrode 122 is smaller. On the other hand, a withstand voltage of the multilayer capacitor 100a or 100b may be higher as the distance between the internal electrodes is increased. Therefore, the distance between the internal electrodes may be adjusted based on the required specification of the multilayer capacitor 100a or 100b (e.g., miniaturization and/or high capacitance required for a capacitor for an electronic device, or high withstand voltage characteristic and/or strong strength required for a capacitor for an electric device). Each thickness of the at least one first internal electrode 121 and the at least one second internal electrode 122 may also be changed based on the distance between the internal electrodes.

For example, the multilayer capacitor 100a or 100b may be designed so that the distance between the at least one first internal electrode 121 and the at least one second internal electrode 122 are greater than twice the thickness of each electrode when required to have the high withstand voltage characteristic and/or the strong strength. For example, the multilayer capacitor 100a or 100b may be designed so that each thickness of the at least one first internal electrode 121 and the at least one second internal electrode 122 is 0.4 μm or less and the total stack number thereof is 400 or more when required to have the miniature size and/or the high capacitance.

The first and second external electrodes 131 and 132 may be disposed on the body 110 while being spaced apart from each other to be respectively connected to the at least one first internal electrode 121 and the at least one second internal electrode 122.

For example, the first and second external electrodes 131 and 132 may each be formed by using a method of printing the paste including the metal component, a sheet transfer method, a pad transfer method, a sputter plating method, an electrolytic plating method, etc. The metal component may be a single component such as copper (Cu), nickel (Ni), palladium (Pd), platinum (Pt), gold (Au), silver (Ag), lead (Pb) or tin (Sn), or an alloy thereof, and the present disclosure is not limited thereto.

The multilayer capacitor 100a or 100b may be mounted or embedded in an external board (e.g., printed circuit board), and may be connected to at least one of the wiring, land, solder and bump of the external board through the first and second external electrodes 131 and 132 to be electrically connected to a circuit (e.g., integrated circuit or processor) electrically connected to the external board.

Referring to FIGS. 1 and 2A-2F, the body 110 may include at least one of an upper cover layer 112, a lower cover layer 113 and a margin region 114.

The upper and lower cover layers 112 and 113 may be disposed to interpose a core region 115 therebetween in the first direction (e.g., Z-direction) and may each have a thickness greater than each thickness of the at least one dielectric layer 111. The upper cover layer 112 may provide an upper surface of the body 110, and the lower cover layer 113 may provide a lower surface of the body 110. A portion of the first or second external electrode 131 or 132 may be disposed on a portion of the lower surface of the body 110.

Each of the upper and lower cover layers 112 and 113 may prevent an external environmental factor (e.g., moisture, plating solution or foreign material) from infiltrating into the core region 115, may protect the body 110 from external impact, and may also improve bending strength of the body 110.

For example, the upper and lower cover layers 112 and 113 may each include the same material or a different material (e.g., thermosetting resin such as epoxy resin) from the at least one dielectric layer 111.

The margin region 114 may be a portion between each boundary line of the at least one first internal electrode 121 and the at least one second internal electrode 122 and the surface of the body 110.

The plurality of margin regions 114 may be disposed to interpose the capacitance region therebetween in a second direction (e.g., Y-direction) perpendicular to the first direction (e.g., Z-direction). For example, the plurality of margin regions 114 may be formed in a manner similar to that of the at least one dielectric layer 111 (however, in a different stack direction).

The plurality of margin regions 114 may prevent the at least one first internal electrode 121 and the at least one second internal electrode 122 from being exposed from the surface of the body 110 in the second direction (e.g., Y-direction), and may thus prevent the external environmental factor (e.g., moisture, plating solution or foreign material) from infiltrating into the at least one first internal electrode 121 and the at least one second internal electrode 122 through the surface of the body in the second direction, thereby improving the reliability and lifespan of the multilayer capacitor 100a or 100b. In addition, the at least one first internal electrode 121 and the at least one second internal electrode 122 may each be efficiently expanded in the second direction due to the plurality of margin regions 114, and the plurality of margin regions 114 may thus allow the overlapping area between the at least one first internal electrode 121 and the at least one second internal electrode 122 to be increased, thereby contributing to improvement in capacitance of the multilayer capacitor 100a or 100b.

The capacitance region may include a portion between the at least one first internal electrode 121 and the at least one second internal electrode 122, thus forming the capacitance of the multilayer capacitor 100a or 100b.

Referring to FIGS. 1, 2A-2F, and 4A, a portion of the first external electrode 131 may overlap the body 110 in the first direction (e.g., Z-direction) and do not overlap a remainder of the first external electrode 131 in the first direction (e.g., Z-direction). A portion of the second external electrode 132 may overlap the body 110 in the first direction (e.g., Z-direction) and do not overlap a remainder of the second external electrode 132 in the first direction (e.g., Z-direction).

A portion of the first or second external electrode 131 or 132 may cover a portion of the lower surface of the body 110, and the rest of the first or second external electrode 131 or 132 may cover a side surface of the body 110 in the X-direction. Accordingly, the first or second external electrode 131 or 132 may not be disposed on the rest three surfaces (upper surface and both side surfaces in the Y-direction) of the body 110. For example, the first and second external electrodes 131 and 132 may each have an L shape.

A factor increasing each optimal thickness of the plurality of margin regions 114 may include a possibility in which electric field concentration and/or a short-circuit occur(s) due to a distance between the at least one first internal electrode 121 and the second external electrode 132 in the Y-direction, and a distance between the at least one second internal electrode 122 and the first external electrode 131 in the Y-direction, and may include reliability of the at least one first internal electrode 121 and the at least one second internal electrode 122 taking into account that the edge of the body 110 is grinded for efficiently forming the first and second external electrodes 131 and 132.

None of the first and second external electrodes 131 and 132 of the multilayer capacitor 100a or 100b according to an exemplary embodiment of the present disclosure may cover the side surface of the body 110 in the Y-direction to remove the factor increasing each optimal thickness of the plurality of margin regions 114, thereby reducing each thickness of the plurality of margin regions 114.

Each thickness of the plurality of margin regions 114 may be reduced, and each width of the at least one first internal electrode 121 and the at least one second internal electrode 122 may thus be increased in the Y-direction without increasing a width of the body 110. Accordingly, the body 110 may have higher capacitance compared to its width.

A factor increasing an optimum thickness of the upper cover layer 112 may include the reliability of the at least one first internal electrode 121 and the at least one second internal electrode 122 taking into account that the edge of the body 110 is grinded for efficiently forming the first and second external electrodes 131 and 132. None of the first and second external electrodes 131 and 132 of the multilayer capacitor 100a or 100b according to an exemplary embodiment of the present disclosure may cover the upper surface of the body 110 to remove the factor increasing the optimal thickness of the upper cover layer 112, thereby further reducing a thickness of the upper cover layer 112.

The thickness of the upper cover layer 112 may be reduced, and each stack number of the at least one first internal electrode 121 and the at least one second internal electrode 122 may thus be increased without increasing the width of the body 110. Accordingly, the body 110 may have the higher capacitance compared to its thickness.

Alternatively, none of the first and second external electrodes 131 and 132 may cover the upper surface of the body 110, and the body 110 may thus be made thicker, and each stack number of the at least one first internal electrode 121 and the at least one second internal electrode 122 may thus be increased without increasing a total thickness of the multilayer capacitor 100a or 100b (including the external electrodes).

However, difficulty in securing the reliability of the first or second external electrode 131 or 132 covering none of the upper surface of the body 110 and its side surface in the Y-direction may be higher than that of the first and second external electrodes covering all the six surfaces of the body 110. That is, efficient formation of the capacitance of the body 110 and the difficulty in securing the reliability of the first or second external electrode 131 or 132 may be in a trade-off relationship.

One portion of the edge of the body 110 may be a portion where a formation direction of the first or second external electrode 131 or 132 is changed. Respective portions of the first or second external electrode 131 or 132 may be affected by the formation direction of the external electrode according to a formation principle of the first or second external electrode 131 or 132, thus having relatively high difficulty in securing formation stability of the portion of the external electrode, where the formation direction of the external electrode is changed among the respective portions of the first or second external electrode 131 or 132. For example, the portion of the first or second external electrode 131 or 132, having lower formation stability, may have a relatively high possibility of interrupted formation of the external electrode, and the portion in which the interrupted formation of the first or second external electrode 131 or 132 occurs may act as a path through which at least one of moisture, a plating solution and external foreign material infiltrate into the body 110, thus affecting the reliability or defect rate of the body 110.

Referring to FIGS. 2A-2F and 4A, at least one of the first and second external electrodes 131 and 132 of the multilayer capacitor 100b according to an exemplary embodiment of the present disclosure may include first electrode layers 131a and 132a and second electrode layers 131b and 132b.

FIGS. 2A-2F and 4A each show that each portion of the first or second external electrode 131 or 132 has the same thickness. However, a portion of the first or second external electrode 131 or 132, in which the first electrode layers 131a or 132a is positioned, may have a thickness greater than the rest (i.e., portion where the first electrode layer is not disposed) of the first or second external electrode due to the first electrode layer 131a or 132a. Accordingly, an interface between the first electrode layer 131a or 132a and the second electrode layer 131b or 132b may be identified not only by direct measurement but also by the thickness of the first or second external electrode 131 or 132.

Based on a shape of the first or second external electrode 131 and 132, a length L1 may not be zero, in which L1 indicates a length of a portion of the first electrode layer 131a or 132a, not overlapping the first or second external electrode 131 or 132 in the first direction (e.g., Z-direction), and a length L3 may not be zero, in which L3 indicates a length of a portion of the second electrode layer 131b or 132b, not overlapping the first or second external electrode 131 or 132 in the first direction (e.g., Z-direction).

The first electrode layer 131a or 132a may cover the one portion of the edge of the body 110.

The second electrode layer 131b or 132b may cover the first electrode layer 131a or 132a, and may be connected to at least a portion of the at least one first internal electrode 121 and the at least one second internal electrode 122. For example, the second electrode layer contacts a portion of the internal electrodes.

Accordingly, the second electrode layer 131b or 132b may collect large capacitance formed by the at least one first internal electrode 121 and the at least one second internal electrode 122, and the first electrode layer 131a or 132a may improve the stability of the first or second external electrode 131 or 132 by more focusing on the portion of the first or second external electrode 131 or 132, having the lower formation stability. Therefore, the multilayer capacitor 100b according to an exemplary embodiment of the present disclosure may satisfy both the higher capacitance compared to its size and the reliability of the first or second external electrode 131 or 132.

Table 1 below shows the size states and mounted states of ten multilayer capacitor samples each having a different width W1 (see FIG. 4A) of a portion of the first electrode layer 131a or 132a, positioned closest to the one portion of the edge of the body 110. Here, a difference between OK and NG size states of the capacitor may be a difference in whether a total width of the multilayer capacitor (including the external electrodes) in the Y-direction is effectively larger than a sum of the widths of the body 110, and a multilayer capacitor sample having the OK size state may have the higher capacitance compared to its total width. The difference between OK and NG mounted states of the capacitor may be a difference in whether the multilayer capacitor is effectively inclined in the Y-direction while being mounted on an external board below. When the multilayer capacitor is inclined in the Y-direction, the width of the multilayer capacitor in the Y-direction after being mounted on the board may be increased, and a multilayer capacitor sample having the OK mounted state may thus have the higher capacitance compared to its effective width after being mounted on the board. Whether the mounted state of the multilayer capacitor is OK may depend on how the capacitor is positioned (e.g., embedded in the external board or disposed in a structure other than the board), and whether the size state of the capacitor is OK may thus be more important than whether the mounted state of the capacitor is OK.

TABLE 1

| Sample no. | W1 (μm) | W2 (μm) | Width of body (μm) | Size state | Mounted state |
|---|---|---|---|---|---|
| 1 | 330 | 312 | 332 | NG | OK |
| 2 | 311 | 311 | 332 | NG | OK |
| 3 | 302 | 311 | 331 | OK | OK |
| 4 | 279 | 313 | 333 | OK | OK |
| 5 | 250 | 312 | 330 | OK | OK |
| 6 | 225 | 310 | 333 | OK | OK |
| 7 | 201 | 311 | 331 | OK | OK |

TABLE 1-continued

| Sample no. | W1 (μm) | W2 (μm) | Width of body (μm) | Size state | Mounted state |
|---|---|---|---|---|---|
| 8 | 181 | 313 | 334 | OK | OK |
| 9 | 156 | 312 | 332 | OK | OK |
| 10 | 135 | 310 | 330 | OK | NG |

Samples 3 to 10 in Table 1 have W1 smaller than W2 (see FIG. 4A), and may thus have the OK size state and form the higher capacitance compared to its size.

In the multilayer capacitor 100b according to an exemplary embodiment of the present disclosure, the width W1 of the portion of the first electrode layer 131a or 132a, positioned closest to the one portion of the edge of the body 110, may be smaller than the width W2 of an end of the second electrode layer 131b or 132b, positioned farthest from the first electrode layer 131a or 132a. Accordingly, the multilayer capacitor 100b may not only secure the reliability of the first or second external electrode 131 or 132 based on the first electrode layer 131a or 132a and the second electrode layer 131b or 132b, but also have the higher capacitance compared to its size.

A relationship between W1 and W2 may affect whether the size state of the capacitor is OK. The reason is that the second electrode layer 131b or 132b may cover a portion corresponding to W1 of the first electrode layer 131a or 132a and a portion corresponding to W2 together, and a portion corresponding to a space occupied by the first electrode layer 131a or 132a, may thus spread on the first electrode layer 131a or 132a in the Y-direction. However, the present disclosure is not limited thereto.

For example, a thickness of the first electrode layer measured at its center between the portion of the first electrode layer 131a or 132a, positioned closest to the one portion of the edge of the body 110 (i.e., portion serving as a reference for W1), and an end of the first electrode layer (i.e., portion serving as a reference for W3), may be smaller than a thickness of the second electrode layer measured at its center between the end of the first electrode layer 131a or 132a (i.e., portion serving as the reference for W3) and the end of the second electrode layer 131b or 132b (i.e., portion serving as a reference for W2).

Accordingly, a volume of the first electrode layer 131a or 132a may be smaller than a volume of the second electrode layer 131b or 132b, and a portion of the second electrode layer 131b or 132b may thus be further suppressed from spreading on the first electrode layer 131a or 132a in the Y-direction, thus allowing the multilayer capacitor 100b to have the further reduced total width in the Y-direction compared to its capacitance.

Samples 3 to 9 in Table 1 each have W1 which is equal to or greater than half the width of the body, and may thus have the OK mounted state and the higher capacitance compared to its size. W1 of the first electrode layer 131a or 132a of the multilayer capacitor 100b according to an exemplary embodiment of the present disclosure may be equal to or greater than half the width of the body, and may have the OK mounted state and the higher capacitance compared to its size.

Table 2 below shows the formation states and capacitance efficiency of five multilayer capacitor samples each having a different length T1 (see FIG. 2F) between the portion of the first electrode layer 131a or 132a, positioned closest to the one portion of the edge of the body 110, and the end (i.e. portion serving as the reference for W3) of the first electrode layer 131a or 132a. Here, a difference between OK and NG formation states of the capacitor may be a difference in whether the first or second external electrode 131 or 132 has the interrupted formation when the first or second external electrode 131 or 132 is formed, and a multilayer capacitor sample having the OK formation state may include the first or second external electrode 131 or 132 having high reliability. A difference between OK and NG capacitance efficiencies of the capacitor may be a difference in whether the first or second external electrode 131 or 132 provides the capacitance of the capacitor, formed by the body 110, without a large loss, and it may be related to whether the formation state of the external electrode 131 or 132 is very NG.

TABLE 2

| Sample no. | T1 (μm) | T2 (μm) | Formation state | Capacitance efficiency |
|---|---|---|---|---|
| 1 | 0 | 25 | NG | NG |
| 2 | 11 | 24 | NG | OK |
| 3 | 24 | 24 | OK | OK |
| 4 | 35 | 25 | OK | OK |
| 5 | 51 | 24 | OK | OK |

Samples 3 to 5 in Table 2 each have T1 equal to or greater than a thickness T2 (see FIG. 2F) of the lower cover layer 113, and may thus have the OK formation state and the first or second external electrode 131 or 132 having high reliability.

In the multilayer capacitor 100b according to an exemplary embodiment of the present disclosure, the thickness T1 between the portion of the first electrode layer 131a or 132a, positioned closest to the one portion of the edge of the body 110 (i.e., portion serving as the reference for W1), and the end of the first electrode layer 131a or 132a (i.e., portion serving as the reference for W3) may be equal to or greater than the thickness T2 of the lower cover layer 113. Accordingly, the multilayer capacitor 100b may include the first or second external electrode 131 or 132 having the higher reliability based on the first electrode layer 131a or 132a and the second electrode layer 131b or 132b.

For example, the first electrode layer 131a or 132a may connect a portion of the at least one first internal electrode 121 and the second electrode layer 131b of the first external electrode 131, or connect a portion of the at least one second internal electrode 122 and the second electrode layer 132b of the second external electrode 132.

Meanwhile, W1 in Table 1 may be an average value of the portions corresponding to W1, based on a YZ cross section of the multilayer capacitor, formed by grinding the multilayer capacitor in the X-direction until the first electrode layer starts to be exposed. W2 in Table 1 may be an average value of the portions corresponding to W2, based on an XY cross section of the multilayer capacitor, exposed after cutting or grinding the body 110 in an XY plane (or Z-direction) including a center of the body 110. T1 or T2 in Table 2 may be an average value of the portions corresponding to T1 or T2, based on an XZ cross section of the multilayer capacitor, exposed after cutting or grinding the body 110 in an XZ plane (or Y-direction) including a center of the body 110. For example, the YZ cross section, the XY plane and the XZ plane may be used in analysis using at least one of the transmission electron microscopy (TEM), the atomic force microscope (AFM), the scanning electron microscope (SEM), the optical microscope and the surface profiler, and W1, W2, T1 or T2 may be measured by a visual inspection or image processing (e.g., identifying a pixel based on the color or brightness of the pixel, filtering a pixel value for efficient pixel identification, integrating a distance between the identified pixels) on an image obtained from the above analysis. All of the thicknesses and widths disclosed herein may be measured similarly to W1, W2, T1 or T2.

Figure 3F:
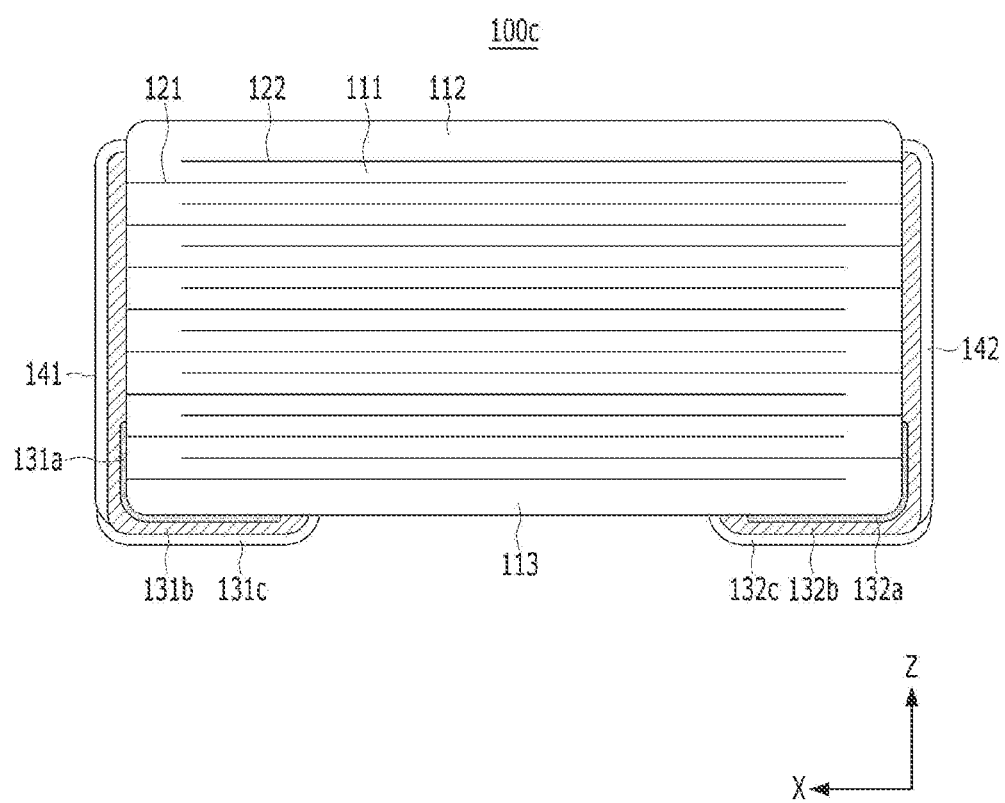
FIG. 3F is a cross-sectional view taken along line A-A' of FIG. 3A.

FIGS. 3A-3E are views illustrating that an insulating layer is added to the multilayer capacitor according to an exemplary embodiment of the present disclosure; and FIG. 3F is a cross-sectional view taken along line A-A' of FIG. 3A.

Referring to FIGS. 3A-3F, a multilayer capacitor 100c according to another exemplary embodiment of the present disclosure may further include a first insulating layer 141 and/or a second insulating layer 142. In the present specification, the insulating layer may be the first insulating layer 141 and/or the second insulating layer 142.

For example, the first or second insulating layer 141 or 142 may include at least one material selected from insulating resin, insulating ceramic and filler of the insulating resin, may include a thermosetting resin such as epoxy, or may include the same material as that of the margin region 114 of FIG. 1.

The first insulating layer 141 may cover an outer surface of the second electrode layer 131b of the first external electrode 131 in a direction (e.g., X-direction) in which the first and second external electrodes 131 and 132 face each other, and the second insulating layer 142 may cover an outer surface of the second electrode layer 132b of the second external electrode 132 in the direction (e.g., X-direction) in which the first and second external electrodes 131 and 132 face each other.

Accordingly, when the multilayer capacitor 100c is mounted on an external board below by using a solder (including a metal material having a low melting point), the first or second insulating layer 141 or 142 may suppress formation of a solder fillet such as the solder climbing up the first and second external electrodes 131 and 132 in the Z-direction. Accordingly, it is possible to increase the efficiency in arranging the land or pad of the external board, thus reducing a distance between the multilayer capacitor 100c and its components adjacent to each other. That is, the multilayer capacitor 100c may have the increased arrangement density.

Referring to FIGS. 2A-2F and 3A-3F, the first or second external electrode 131 or 132 of the multilayer capacitor 100b or 100c according to the exemplary embodiments of the present disclosure may further include a third electrode layer 131c or 132c covering at least a portion of the second electrode layer 131b or 132b and including a metal material different from a metal material included in the second electrode layer 131b or 132b.

For example, the first electrode layer 131a or 132a, the second electrode layer 131b or 132b, or the third electrode layer 131c or 132c may each include one or more selected materials of copper (Cu), nickel (Ni), tin (Sn), palladium (Pd), platinum (Pt), gold (Au), silver (Ag) and lead (Pb). For example, the third electrode layer 131c or 132c may include tin (Sn) or lead (Pb) having the low melting point in consideration of its connectivity to the solder, or may include nickel (Ni) in consideration of its connectivity to the second electrode layer 131b or 132b. For example, the first electrode layer 131a or 132a and the second electrode layer 131b or 132b may each include at least one of copper (Cu), silver (Ag), and gold (Au) and platinum (Pt), having high conductivity, to efficiently provide the large capacitance formed in the body 110, may include palladium (Pd) in consideration of high voltage application, or may include nickel (Ni) in consideration of its connectivity to an adjacent electrode layer (or internal electrode).

When the first or second insulating layer 141 or 142 of FIGS. 3A-3F is disposed on a portion of an outer surface (e.g., side surface) of the first or second external electrode 131 or 132, the third electrode layer 131c or 132c may be disposed on another portion of outer surface (e.g., lower surface) of the first or second external electrode 131 or 132.

Figure 4B:
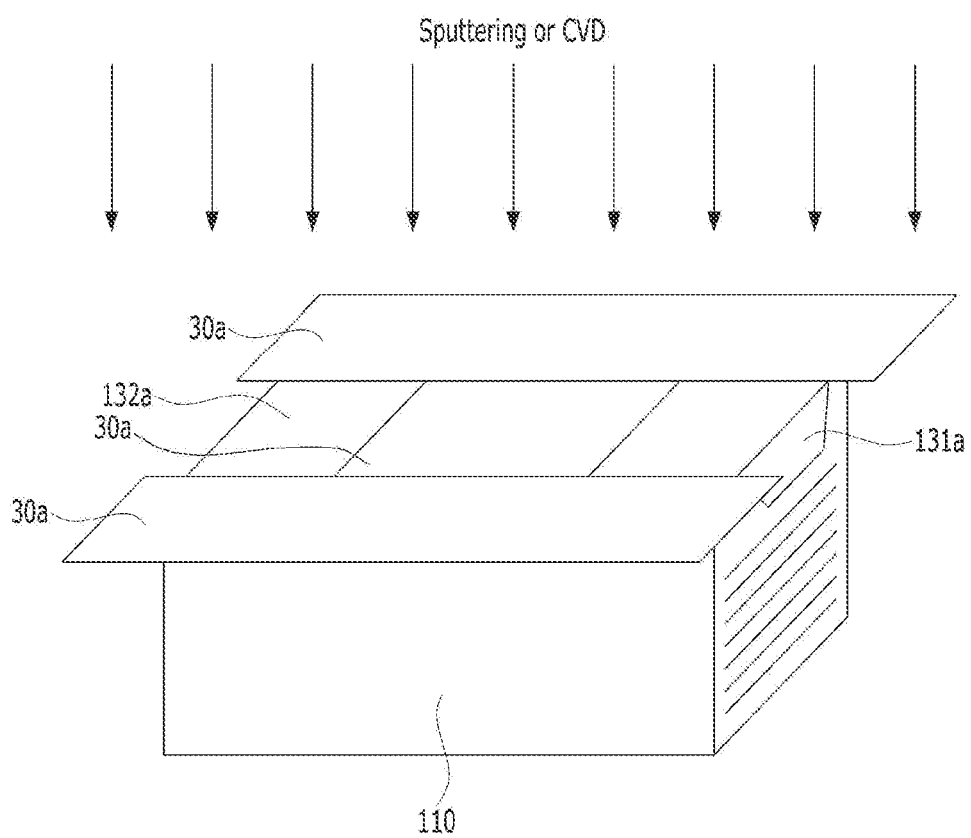
FIG. 4B is a perspective view illustrating a process of forming the first electrode layer of the multilayer capacitor according to an exemplary embodiment of the present disclosure.

FIG. 4B is a perspective view illustrating a process of forming the first electrode layer of the multilayer capacitor according to an exemplary embodiment of the present disclosure.

Referring to FIG. 4B, the first electrode layer 131a or 132a may be a plating layer formed by a plating process such as sputtering or chemical vapor deposition (CVD). Each of the second electrode layer 131b or 132b and the third electrode layer 131c or 132c of FIGS. 2F and 3F may also be the plating layer formed by the plating process.

For example, a mask 30a may temporarily cover a position of the capacitor, where the first electrode layer 131a or 132a is not formed during the plating process. For example, the length and/or width of a region not covered by the mask 30a and a posture of the body 110 may be used as a factor adjusting at least one of L1, W1 and T1 of the first electrode layer 131a or 132a (see FIGS. 2F and 4A).

Due to a characteristic of the plating process, a width of each portion of the first electrode layer 131a or 132a may be increased as a distance between the masks 30a is increased. Accordingly, referring to FIG. 4A, W1 may be smaller than the width W3 of the end of the first electrode layer 131a or 132a, positioned closest to the end (i.e. portion serving as the reference for W2) of the second electrode layer 131b or 132b.

When the second electrode layer 131b or 132b and the third electrode layer 131c or 132c are also the plating layers, W3 may act as a factor by which the second electrode layer 131b or 132b and the third electrode layer 131c or 132c of FIGS. 2F and 3F spread in the Y-direction. However, W1 of the first electrode layer 131a or 132a of the multilayer capacitor according to an exemplary embodiment of the present disclosure is smaller than W2 of the second electrode layer 131b or 132b. Therefore, it is possible to suppress the second electrode layer 131b or 132b and the third electrode layer 131c or 132c from spreading in the Y-direction, and the width of the first or second external electrode 131 or 132 from being excessively greater in the Y-direction.

As set forth above, the multilayer capacitor according to an exemplary embodiment of the present disclosure may have the higher capacitance compared to its total effective size, or may include the external electrode having the high reliability.

While the exemplary embodiments have been shown and described above, it will be apparent to those skilled in the art that modifications and variations could be made without departing from the scope of the present disclosure as defined by the appended claims.

What is claimed is:

1. A multilayer capacitor comprising:
   a body including a capacitance region in which at least one first internal electrode and at least one second internal electrode are alternately stacked on each other interposing at least one dielectric layer therebetween in a first direction; and
   first and second external electrodes disposed on the body while being spaced apart from each other to be respectively connected to the at least one first internal electrode and the at least one second internal electrode, wherein a portion of the first external electrode overlaps the body in the first direction and does not overlap a remainder of the first external electrode in the first direction,
a portion of the second external electrode overlaps the body in the first direction and does not overlap a remainder of the second external electrode in the first direction,
at least one of the first and second external electrodes includes:
a first electrode layer including a metal and covering one portion of an edge of the body; and
a second electrode layer covering the first electrode layer and connected to at least a portion of the at least one first internal electrode or the at least one second internal electrode, and
a width W1 of a portion of the first electrode layer, positioned closest to the one portion of the edge of the body, is narrower than a width W2 of an end of the second electrode layer, positioned farthest from the first electrode layer.

2. The multilayer capacitor of claim 1, wherein W1 is narrower than a width W3 of an end of the first electrode layer, positioned closest to the end of the second electrode layer.

3. The multilayer capacitor of claim 2, wherein W2>W3>W1.

4. The multilayer capacitor of claim 1, wherein W1 is equal to or greater than half a width of the body.

5. The multilayer capacitor of claim 1, wherein the first electrode layer is a plating layer.

6. The multilayer capacitor of claim 5, wherein at least one of the first and second external electrodes includes a third electrode layer covering at least a portion of the second electrode layer and including a metal material different from a metal material included in the second electrode layer, and
each of the second electrode layer and the third electrode layer is a plating layer.

7. The multilayer capacitor of claim 1, wherein the second electrode layer is a plating layer.

8. The multilayer capacitor of claim 1, wherein at least one of the first and second external electrodes includes a third electrode layer covering at least a portion of the second electrode layer and including a metal material different from a metal material included in the second electrode layer, and
the third electrode layer is a plating layer.

9. The multilayer capacitor of claim 8, further comprising an insulating layer covering the other portion of the second electrode layer in a direction in which the first and second external electrodes face each other.

10. The multilayer capacitor of claim 1, wherein a thickness of the first electrode layer measured at its center between the portion of the first electrode layer, positioned closest to the one portion of the edge of the body and the end of the first electrode layer, is smaller than a thickness of the second electrode layer measured at its center between the end of the first electrode layer and the end of the second electrode layer.

11. The multilayer capacitor of claim 1, wherein the first electrode layer connects a portion of the at least one first internal electrode and the second electrode layer of the first external electrode, or connects a portion of the at least one second internal electrode and the second electrode layer of the second external electrode.

12. The multilayer capacitor of claim 1, wherein the body further includes a lower cover layer providing a lower surface of the body, partially covered by the first and second external electrodes, and overlapping the capacitive region in the first direction, and
a length T1 between the portion of the first electrode layer, positioned closest to the one portion of the edge of the body, and the end of the first electrode layer is equal to or greater than a thickness T2 of the lower cover layer.

13. A method of manufacturing the multilayer capacitor of claim 1, the method comprising:
performing sputtering or chemical vapor deposition to form the first electrode layer on the body of the multilayer capacitor.

14. The method of claim 13, further comprising covering a portion of the body with at least one mask so that during the performing of the sputtering or the chemical vapor deposition the first electrode layer is not formed in the covered portion.

15. The multilayer capacitor of claim 1, wherein W1 and W2 are each smaller than a width of the body.

16. The multilayer capacitor of claim 1, wherein the second electrode layer directly connects to the at least the portion of the at least one first internal electrode or the at least one second internal electrode.

17. The multilayer capacitor of claim 1, wherein the first external electrode and the second external electrode have an L shape.

18. A multilayer capacitor comprising:
a body including a capacitance region in which at least one first internal electrode and at least one second internal electrode are alternately stacked on each other interposing at least one dielectric layer therebetween in a first direction; and
first and second external electrodes disposed on the body while being spaced apart from each other to be respectively connected to the at least one first internal electrode and the at least one second internal electrode,
wherein a portion of the first external electrode overlaps the body in the first direction and does not overlap a remainder of the first external electrode in the first direction,
a portion of the second external electrode overlaps the body in the first direction and does not overlap a remainder of the second external electrode in the first direction,
the body further includes a lower cover layer providing a lower surface of the body, partially covered by the first and second external electrodes and overlapping the capacitive region in the first direction,
at least one of the first and second external electrodes includes:
a first electrode layer including a metal and covering one portion of an edge of the body; and
a second electrode layer covering the first electrode layer and connected to at least a portion of the at least one first internal electrode or the at least one second internal electrode, and
a length T1 between a portion of the first electrode layer, positioned closest to the one portion of the edge of the body, and an end of the first electrode layer is equal to or greater than a thickness T2 of the lower cover layer.

19. The multilayer capacitor of claim 18, wherein the first electrode layer connects a portion of the at least one first internal electrode and the first external electrode, or a portion of the at least one second internal electrode and the second external electrode.

20. The multilayer capacitor of claim 18, wherein a thickness of the first electrode layer measured at its center between the portion of the first electrode layer, positioned closest to the one portion of the edge of the body, and the end of the first electrode layer, is smaller than a thickness of the second electrode layer measured at its center between the end of the first electrode layer and an end of the second electrode layer.

21. The multilayer capacitor of claim 18, further comprising an insulating layer covering a portion of the second electrode layer in a direction in which the first and second external electrodes face each other.

22. The multilayer capacitor of claim 18, wherein at least one of the first and second external electrodes includes a third electrode layer covering at least a portion of the second electrode layer and including a metal material different from a metal material included in the second electrode layer, and
the third electrode layer is a plating layer.

23. The multilayer capacitor of claim 22, wherein each of the first electrode layer and the second electrode layer is a plating layer.

24. The multilayer capacitor of claim 18, wherein the first electrode layer is a plating layer.

* * * * *